(12) United States Patent
Wang et al.

(10) Patent No.: US 11,448,737 B2
(45) Date of Patent: Sep. 20, 2022

(54) MINIATURE SOLID-STATE LASER RADAR AND DATA PROCESSING METHOD THEREFOR

(71) Applicant: SHANGHAI ANYEYE TECHNOLOGY CO., LTD., Shanghai (CN)

(72) Inventors: Qiang Wang, Shanghai (CN); Jianfei Zhang, Shanghai (CN); Huan Wang, Shanghai (CN)

(*) Notice: Subject to any disclaimer, the term of this patent is extended or adjusted under 35 U.S.C. 154(b) by 0 days.

(21) Appl. No.: 17/483,738

(22) Filed: Sep. 23, 2021

(65) Prior Publication Data

US 2022/0011405 A1 Jan. 13, 2022

Related U.S. Application Data

(63) Continuation of application No. PCT/CN2020/074802, filed on Feb. 12, 2020.

(30) Foreign Application Priority Data

Mar. 28, 2019 (CN) .......................... 201910241228.2

(51) Int. Cl.
    *G01S 7/484* (2006.01)
    *G01S 17/10* (2020.01)
    *G01S 7/481* (2006.01)

(52) U.S. Cl.
    CPC ............ *G01S 7/484* (2013.01); *G01S 7/4813* (2013.01); *G01S 17/10* (2013.01)

(58) Field of Classification Search
    CPC ........ G01S 7/484; G01S 7/4813; G01S 7/481; G01S 17/10; G01S 17/48
    See application file for complete search history.

(56) References Cited

U.S. PATENT DOCUMENTS

| 4,709,156 A | * | 11/1987 | Murphy | ................. | G01B 11/24 |
| | | | | | 250/559.22 |
| 6,529,268 B1 | * | 3/2003 | Oka | ........................ | G02B 7/32 |
| | | | | | 356/3.04 |

(Continued)

FOREIGN PATENT DOCUMENTS

| CN | 106569197 A | 4/2017 |
| CN | 206193240 U | 5/2017 |

(Continued)

OTHER PUBLICATIONS

ISR of PCT/CN2020/074802.

*Primary Examiner* — Sang H Nguyen

(57) ABSTRACT

A miniature solid-state laser radar and a data processing method therefor. The miniature solid-state laser radar includes a laser emitter (1), an imaging lens (2), an imaging sensor (3), and a control and data processing apparatus (4). The laser emitter (1) is used to emit linear laser; the imaging lens (2) is used to collect reflected laser light and image same on the imaging sensor (3); the imaging sensor (3) receives light focused through the imaging lens and images the same; and the control and data processing apparatus (4) is used to control working of the laser emitter (1), receive imaging data from the imaging sensor (3), run a structural light algorithm, and finally acquire point cloud data in a space environment.

8 Claims, 5 Drawing Sheets

(56) References Cited

U.S. PATENT DOCUMENTS

| | | | |
|---|---|---|---|
| 2009/0147239 A1* | 6/2009 | Zhu | G01S 7/4817 |
| | | | 356/5.01 |
| 2009/0195790 A1* | 8/2009 | Zhu | G01B 11/24 |
| | | | 356/612 |
| 2014/0078514 A1* | 3/2014 | Zhu | G01S 17/10 |
| | | | 356/606 |
| 2016/0170202 A1* | 6/2016 | Yasuda | G02B 26/12 |
| | | | 359/201.2 |
| 2017/0184450 A1 | 6/2017 | Doylend et al. | |
| 2018/0059220 A1* | 3/2018 | Irish | G01S 17/10 |
| 2018/0172803 A1* | 6/2018 | Liang | G01S 7/4816 |
| 2018/0188359 A1* | 7/2018 | Droz | G01S 17/42 |
| 2018/0188545 A1* | 7/2018 | McMichael | G02B 27/0916 |
| 2019/0041498 A1* | 2/2019 | Droz | G02B 6/0055 |
| 2019/0162858 A1* | 5/2019 | McCord | G02B 19/0052 |

FOREIGN PATENT DOCUMENTS

| | | |
|---|---|---|
| CN | 107271984 A | 10/2017 |
| CN | 109375237 A | 2/2019 |
| WO | 2019041267 A1 | 3/2019 |

\* cited by examiner

MINIATURE SOLID-STATE LASER RADAR AND DATA PROCESSING METHOD THEREFOR

TECHNICAL FIELD

The present disclosure relates to the field of ranging equipment, and specifically relates to a miniature solid-state laser radar and a data processing method therefor.

BACKGROUND

At present, there are many ways to perform ranging in the existing art. Ultrasonic ranging and laser ranging are current mainstream ranging methods.

The ultrasonic ranging uses a piezoelectric or magnetostriction phenomenon to generate ultrasonic waves for ranging. The ultrasonic ranging system includes an ultrasonic generating device and an ultrasonic receiving device. The ultrasonic generating device emits ultrasonic waves. The ultrasonic waves will be reflected when they meet obstacles or targets during propagation, and are finally received by an ultrasonic receiver. A distance can be calculated by means of an ultrasonic wave propagation velocity and the time required for ultrasonic wave propagation. However, the ultrasonic waves will be subjected to diffuse reflection on a curved surface or a bent surface, which affects the measurement accuracy. Meanwhile, the ultrasonic ranging device has low interference resistance, so it is easily affected by wind or other natural factors.

The laser ranging is another ranging way. The laser ranging can be divided into many methods according to different used physical information. In some laser ranging methods, the laser round-trip time is indirectly measured by using phase changes of the reflected waves. In some other laser ranging methods, the laser round-trip time is directly measured by using pulses. Distance information can be calculated according to the laser round-trip time. In laser triangulation ranging, a laser device, a target point and the laser receiving device are placed on three points. The laser device emits laser, and the laser is finally received by the laser receiver after being reflected by the target point. The laser receiver calculates a distance according to a laser triangulation ranging principle after receiving the laser.

A mechanical scanning laser radar in the existing art is additionally provided with a laser rotation scanning device based on point laser triangulation ranging to complete 360-degree scanning of a surrounding environment and ranging. However, in the mechanical scanning laser radar, due to the presence of a motion device, a point laser ranging module needs to be driven by rotation of a motor to maintain circumferential motion, so that the mechanical scanning laser radar has short life, large volume and high price.

SUMMARY

The present disclosure aims to provide a miniature solid-state laser radar for the defects in the existing art to complete measurement of a surrounding environment.

In order to solve the above technical problems, the technical solution of the present disclosure is realized below.

A miniature solid-state laser radar includes a laser emitter, an imaging lens, an imaging sensor, and a control and data processing apparatus.

The laser emitter is used to emit linear laser;

the imaging lens is used to collect reflected laser light and image same on the imaging sensor;

the imaging sensor receives the light focused through the imaging lens and images the same;

the control and data processing apparatus is used to control working of the laser emitter, receive imaging data from the imaging sensor, run a structural light algorithm, finally acquire point cloud data in a space environment.

After the light emitted by the laser emitter irradiates a surface of an object, the light is reflected by the surface of the object, is then received by the imaging lens, and is finally imaged on the imaging lens. The laser emitter and the imaging sensor are both electrically connected with the control and data processing apparatus.

Further, the imaging lens is an asymmetric optical lens which has an asymmetric focusing characteristic, that is, an equivalent focal length of the imaging lens in a direction of a connecting line between the laser emitter and the imaging lens is greater than an equivalent focal length in a direction which is perpendicular to the connecting line between laser emitter and the imaging lens.

Further, the front end of the imaging sensor is provided with a narrow-band band-pass filtering lens; and a center wavelength of the narrow-band band-pass filtering lens is the same as a wavelength of the laser emitted by the laser emitter.

Further, the laser emitter includes a laser driving circuit, a laser diode, and a laser projection lens.

Further, the control and data processing apparatus is electrically connected with the laser emitter and the imaging sensor; the control and data processing apparatus is composed of a timing control interface, a data communication interface and a central processing unit; the timing control interface is electrically connected with the laser emitter and the imaging sensor; and the data communication interface is electrically connected with the imaging sensor.

Further, the control and data processing apparatus is simultaneously connected with 4 laser emitters and 4 imaging sensors; the data communication interface and the imaging sensor are connected through an electronic switch; the imaging lens is arranged in front of the imaging sensors to focus the light on the imaging sensors; for the imaging lens, a level angle of the field of vision is greater than or equal to 90 degrees; a dispersion angle of the laser emitted by the laser emitter is greater than or equal to 90 degrees; and the field of vision of the imaging lens is superposed with a laser region emitted by the laser emitter.

A data processing method for a miniature solid-state laser radar is provided. The miniature solid-state laser radar includes a laser emitter, an imaging lens, an imaging sensor and a control and data processing apparatus. The control and data processing apparatus is composed of a timing control interface, a data communication interface and a central processing unit. The method includes the following steps:

at step I, the laser emitter is controlled by the timing control interface to selectively emit linear laser;

at step II, the imaging lens collects reflected laser light and images same on the imaging sensor;

at step III, the imaging sensor is controlled by the timing control interface to start exposure, receives light focused by the imaging lens, and sends imaging data to the central processing unit through the data communication interface; and at step IV, the central processing unit receives the imaging data, runs a structural light algorithm, and finally acquires point cloud data in a space environment.

Further, at step III, the central processing unit alternately controls, by means of the timing control interface, working of the laser emitter on the basis of periodically controlling the exposure of the imaging sensor. In a first time period, the timing control circuit controls the laser emitter to emit laser, and the imaging sensor synchronously starts exposure; and after a time interval Ton, the laser emitter is shut off, and the imaging sensor stops exposure. In a second time period, the central processing unit controls, by means of the timing control interface, the laser emitter to not emit laser, and the imaging sensor starts exposure; and after the time interval Ton, the imaging sensor stops exposure. The first time period and the second time period are cyclically repeated.

Further, the timing control interface controls the laser emitter and the imaging sensor to work at different moments, and splices a plurality of groups of final point cloud data results to obtain spliced large-angle-range point cloud data.

Further, the structural light algorithm includes laser light extraction and triangulation solving. The laser light extraction is specifically to extract laser light through background modeling, that is, two adjacent frames of imaging data of the imaging sensor are compared. When a difference between two frames of acquired pixel data is greater than a specified threshold, it is determined that this pixel is located in a laser light candidate region. The triangulation solving is specifically to solve three-dimensional coordinates of each subpixel point on the imaging sensor belonging to the laser light in a space through the triangulation measurement principle.

The present disclosure can bring the following beneficial effects.

The technical effects of the present disclosure are mainly reflected in the following several points.

1. In the present disclosure, linear laser is innovatively used to perform triangulation. By means of a structural design of integration of the laser emitter, the imaging lens, the imaging sensor and the control and data processing apparatus, ranging modeling is performed on the surrounding environment in a solid state in combination with an electronic switching technology, so that the cost of a scanning apparatus due to spot-shaped laser and mechanical scanning can be avoided; and furthermore, the system stability can be improved, the service life can be prolonged, and the system volume can be reduced.

2. In the present disclosure, the asymmetric optical lens is used as the imaging lens, so that baseline distances between the laser emitter and the imaging lens as well as between the laser emitter and an imaging chip can be greatly reduced, and the system can be miniaturized.

3. The data processing method of the present disclosure uses a laser short-pulse working means, so that enough high peak power can be provided under the premise of relatively low average power and the safety of human eyes to supplement the problem of energy attenuation caused by linear laser and increase the working distance.

4. The data processing method of the present disclosure uses a method based on a narrow-band filter and background modeling, which can effectively extract laser light and suppress noise interference, so that the system can be operated under the sunlight.

The foregoing description is only a summary of the technical solution of the present disclosure. To know the technical measures of the present disclosure more clearly, the technical solutions can be implemented in accordance with the content of the specification, and to make the foregoing and other objectives, features and advantages of the present disclosure more understandable, the present disclosure is described in detail below in combination with preferable embodiments and accompanying drawings.

BRIEF DESCRIPTION OF THE DRAWINGS

To describe the embodiments of the disclosure or the technical solutions in the existing art more clearly, drawings required to be used in the embodiments or the illustration of the existing art will be briefly introduced below. Obviously, the drawings in the illustration below are some embodiments of the disclosure. Those ordinarily skilled in the art also can acquire other drawings according to the provided drawings without doing creative work.

1: laser emitter; 2: imaging lens; 3: imaging sensor; 4: control and data processing apparatus 5: linear laser ranging system; 6: linear laser ranging system operating angle 7: asymmetric field of vision; 8: solid-state laser radar; 9: linear laser plane; 10: obstacle 11: image imaged in a first clock period; 12: image imaged in a second clock period 13: laser light region; 14: extracted laser light; 15: point cloud data

DESCRIPTION OF THE EMBODIMENTS

In order to further describe the technical measures, creation features, objectives and effects which are realized by the present disclosure, specific implementation modes, structures and features of a miniature solid-state laser radar, and a data processing method and effects thereof provided according to the present disclosure are described in detail below in combination with the accompanying drawings and preferred embodiments.

Figure 1:
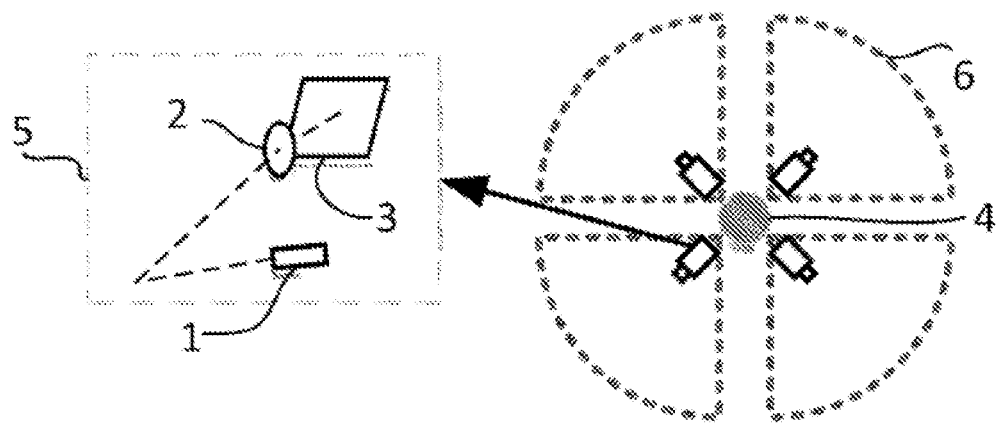
FIG. 1 is a schematic structural diagram of a solid-state laser radar.

As shown in FIG. 1, a miniature solid-state laser radar includes a laser emitter 1, an imaging lens 2, an imaging sensor 3, and a control and data processing apparatus 4. The laser emitter 1 is used to emit linear laser. The imaging lens 2 is used to collect reflected laser light and image same on the imaging sensor. The imaging sensor 3 receives the light focused through the imaging lens and images the same. The control and data processing apparatus 4 is used to control working of the laser emitter, receive imaging data from the imaging sensor 3, run a structural light algorithm, and finally obtain point cloud data in a space environment.

One laser emitter 1, one imaging lens 2 and one imaging sensor 3 form a group of linear laser ranging system 5. Four groups of linear laser ranging systems 5 are encircled to form a circle in the space and are electrically connected with the control and data processing apparatus 4, respectively, so as to form a solid-state laser radar with a large-angle working range. The front end of the imaging sensor 3 is provided with a narrow-band band-pass filtering lens. A center wavelength of the narrow-band band-pass filtering lens is the same as a wavelength of the laser emitted by the laser emitter.

Figure 2:
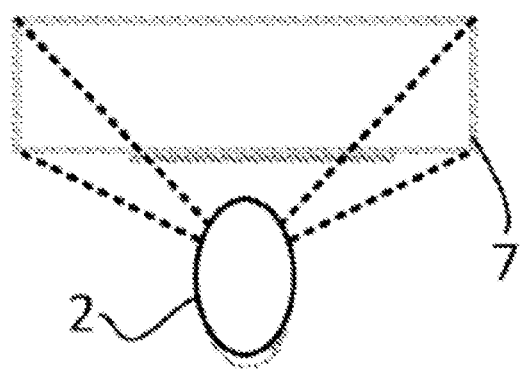
FIG. 2 is an asymmetric characteristic of an imaging lens in the present disclosure.

As shown in FIG. 2, the imaging lens 2 has a short equivalent focal length in a horizontal direction and a long equivalent focal length in a vertical direction. A field of vision 7 is of an asymmetric structure. By the application of the asymmetric imaging lens, baseline distances between the laser emitter and the imaging lens as well as between the laser emitter and an imaging chip can be greatly reduced, so that the system can be miniaturized.

Figure 3:
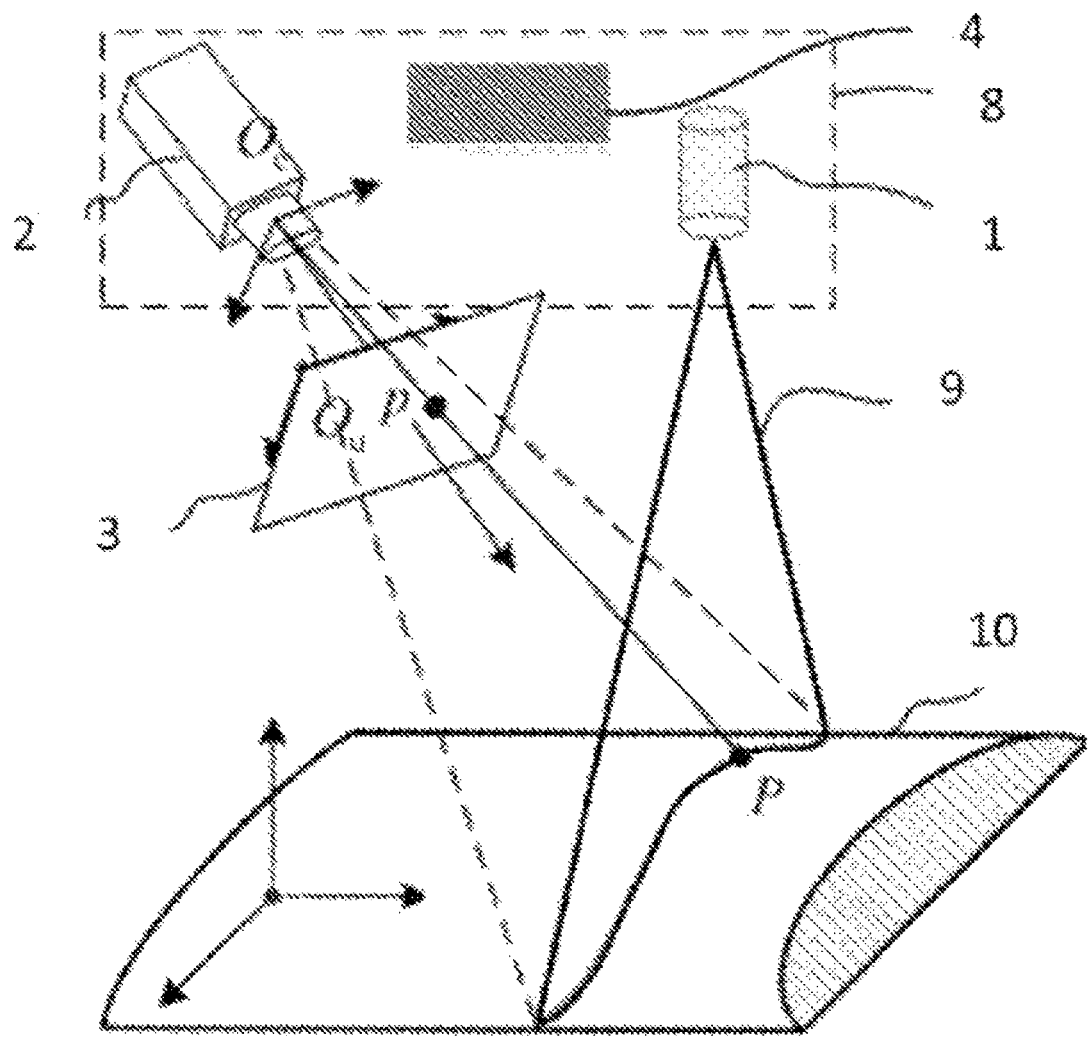
FIG. 3 is a positional relationship diagram between a laser beam and an imaging lens as well as an imaging sensor.

As shown in FIG. 3, the control and data processing apparatus 4 in the solid-state laser radar 8 controls the laser emitter 1 to emit linear laser 9. The linear laser 9 is reflected by a tested object 10 in a spatial propagation process and is converged by the imaging lens 2 and imaged on the imaging sensor 3 (a virtual imaging plane position). The control and data processing apparatus 4 analyzes and processes the imaging data to acquire final laser ranging point cloud data.

Figure 4:
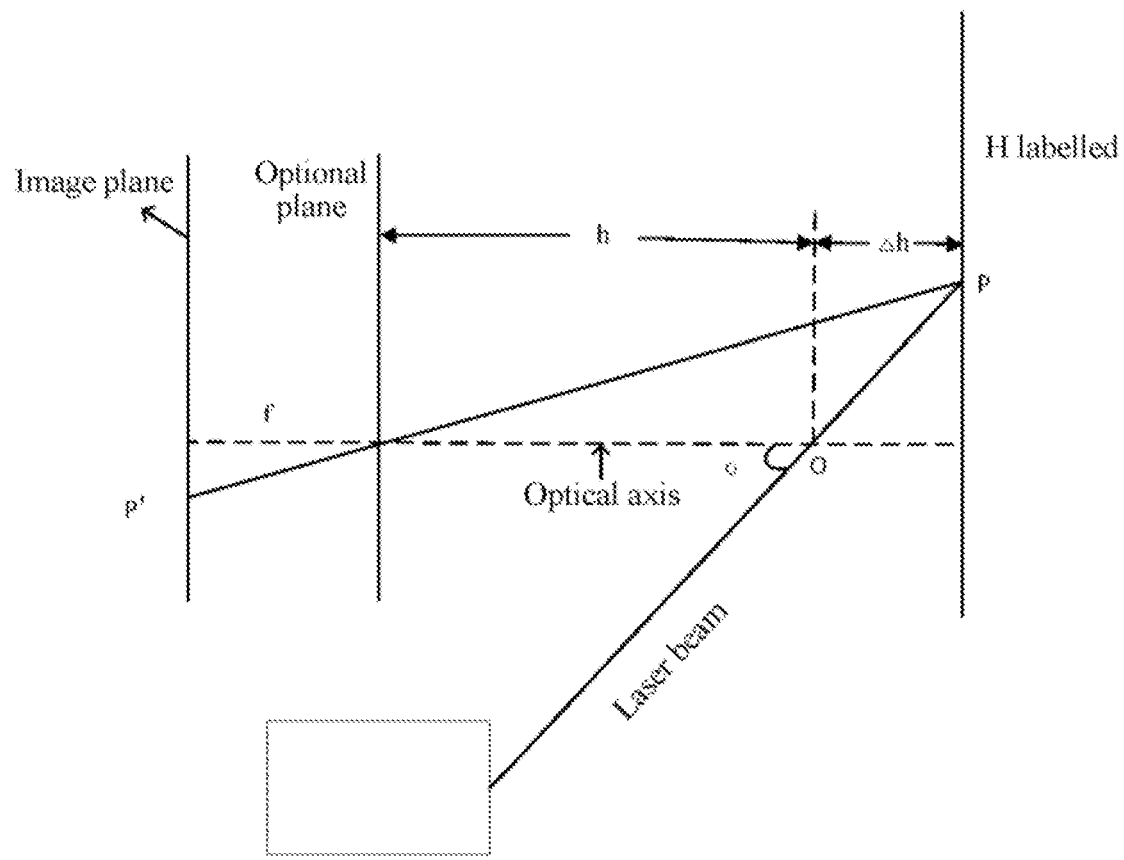
FIG. 4 is a schematic diagram of measuring a distance between a target point and a device in the present disclosure.
Figure 5:
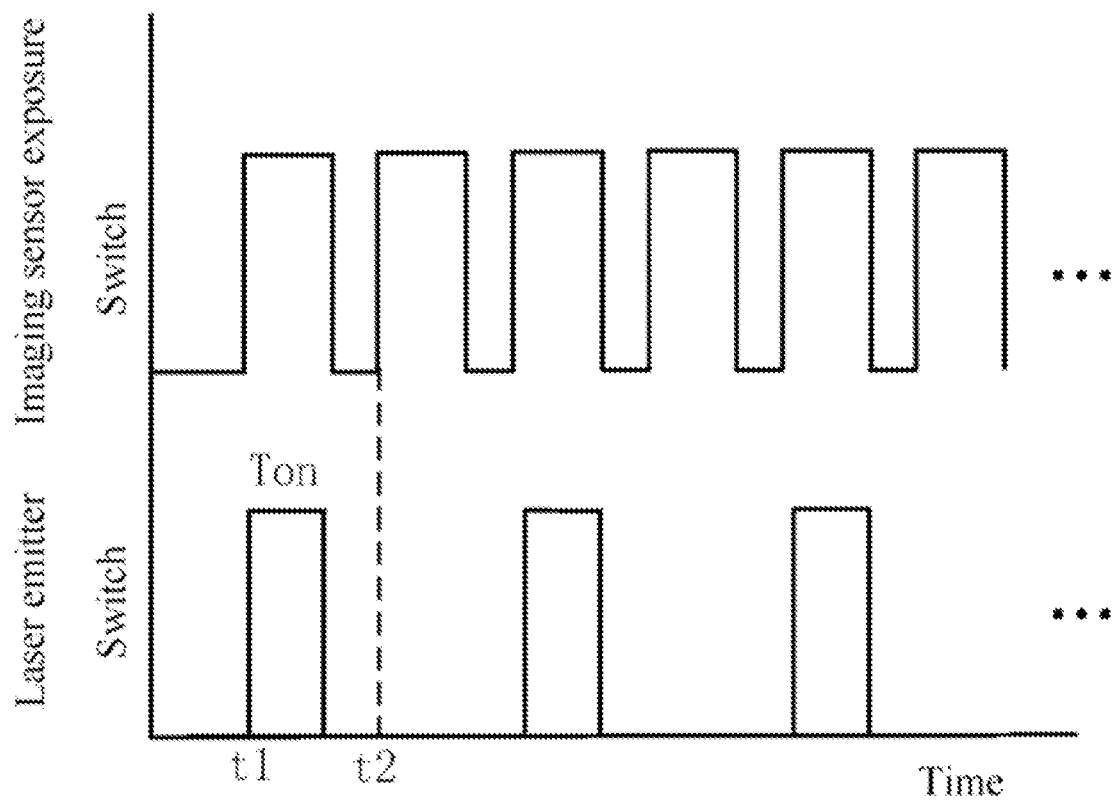
FIG. 5 is a timing diagram illustrating that a timing control interface controls a laser emitter and an imaging sensor.
Figure 6:
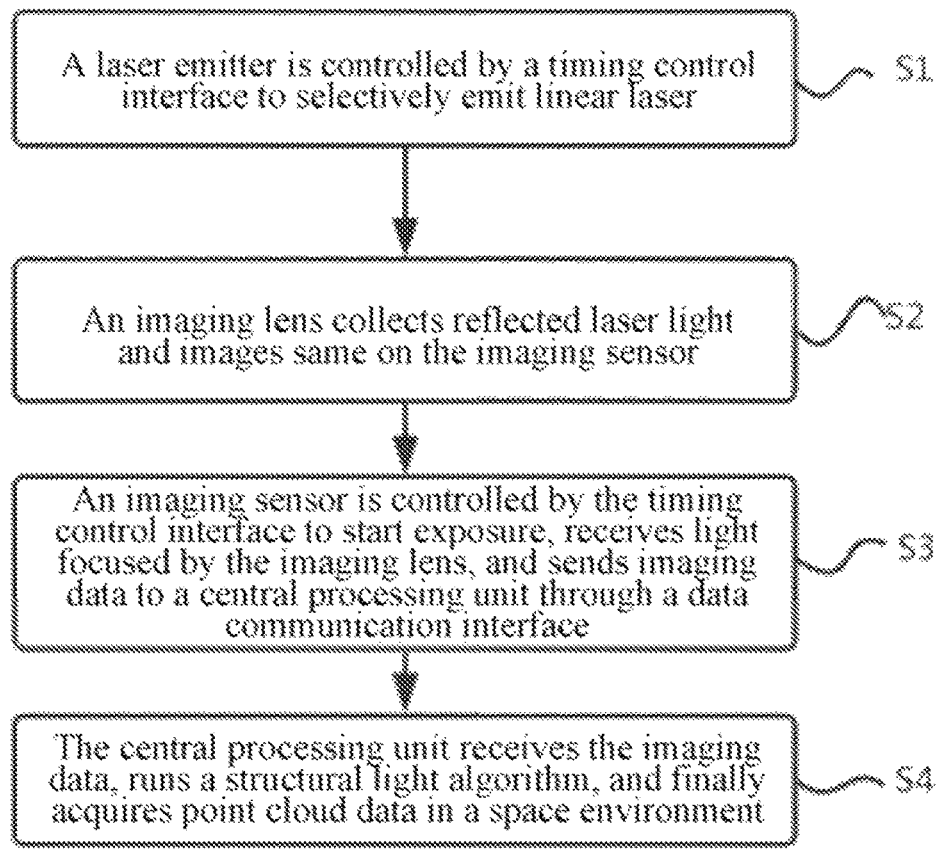
FIG. 6 is a flow chart of a data processing method for a solid-state laser radar of the present disclosure.

As shown in FIG. 4, in the present disclosure, a triangulation principle is that an included angle between a laser beam and an optical axis of a camera is θ, and an intersection is O. The laser beam is projected to an obstacle to form a point P. P' is a mirror image of the point P. A vertical distance from the point O to a photocenter plane is h, and a vertical distance from the point P to the point O is Δh. v is a distance from the point P' to the axis u of an imaging plane, and z is a vertical distance from the point P to the photocenter plane. A focal length of the camera is f There is:

$$z = \frac{hf\tan\theta}{f\tan\theta + v}$$

One group of application of the miniature solid-state laser radar of the above embodiment and a data processing example is provided below.

At step I, the laser emitter is controlled by the timing control interface to emit linear laser.

At step II, the imaging lens collects reflected laser light and images same on the imaging sensor.

At step III, the imaging sensor is controlled by the timing control interface to start exposure, receives the light focused through the imaging lens and sends imaging data to the central processing unit through the data communication interface. Specifically, in a first time period, the timing control circuit controls the laser emitter to emit laser, and the imaging sensor synchronously starts exposure; and after a time interval of 1 ms, the laser emitter is shut off, and the imaging sensor stops exposure. In a second time period, the timing control circuit controls the laser emitter to not emit laser, and the imaging sensor starts exposure; and after the time interval of 1 ms, the imaging sensor stops exposure. The first time period and the second time period are cyclically repeated. An exposure duration of the imaging sensor is valued between 100 us and 10 ms, and the exposure durations of the imaging sensor in the first and second time periods are equal.

At step IV, the central processing unit receives imaging data and runs the structural light algorithm including laser light extraction and triangulation solving. The laser light extraction is specifically to extract laser light through background modeling, that is, two adjacent frames of imaging data of the imaging sensor are compared. When a difference between two frames of acquired pixel data is greater than a specified threshold, it is determined that this pixel is located in a laser light candidate region.

The triangulation solving is specifically to solve three-dimensional coordinates of each sub-pixel point on the imaging sensor belonging to the laser light in a space through the triangulation measurement principle. A plurality of groups of final point cloud data results are spliced to obtain spliced large-angle-range point cloud data, thus finally acquiring the point cloud data in the space environment.

Figure 7:
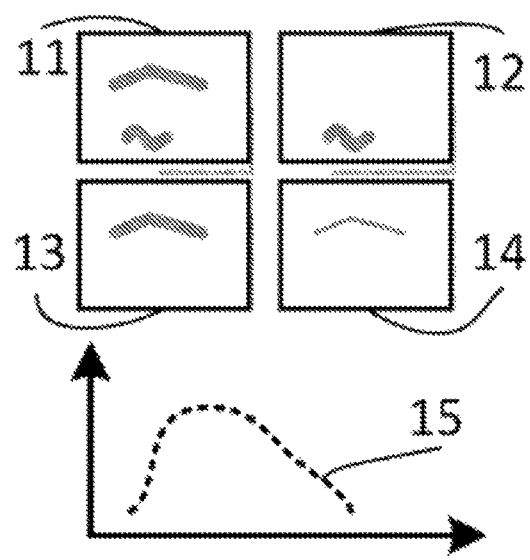
FIG. 7 is a schematic diagram of a laser light extraction and structural light algorithm of the present disclosure.

As shown in FIG. 7, by means of comparing a first clock period imaged image 11 with a second clock period imaged image 12, a laser light region 13 can be extracted by using a background subtraction method. Extracted laser light 14 is obtained by performing sub-pixel analysis on the laser light region 13, and the structural light algorithm is executed on each pixel point on the extracted laser light 14 to acquire the point cloud data 15.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. A miniature solid-state laser radar, comprising a laser emitter, an imaging lens, an imaging sensor, and a control and data processing apparatus, wherein
   the laser emitter is used to emit linear laser;
   the imaging lens is used to collect reflected laser light and image same on the imaging sensor; the imaging lens is an asymmetric optical lens which has an asymmetric focusing characteristic; an equivalent focal length of the imaging lens in a direction of a connecting line between the laser emitter and the imaging lens is greater than an equivalent focal length in a direction which is perpendicular to the connecting line between the laser emitter and the imaging lens;
   the imaging sensor receives the light focused through the imaging lens and images the same;
   the control and data processing apparatus is used to control the laser emitter to work, receive imaging data of the imaging sensor and perform a structural light method to finally acquire point cloud data in a space environment, wherein the structural light method comprises laser light extraction and triangulation solving; the laser light extraction is configured to compare two adjacent frames of imaging data of the imaging sensor; when a difference between two frames of acquired pixel data is greater than a specified threshold, the pixel is determined to be located in a laser light candidate region; and the triangulation solving is configured to obtain three-dimensional coordinates of each sub-pixel point on the imaging sensor laser light candidate region through a triangulation measurement principle;
   after the light emitted by the laser emitter irradiates a surface of an object, the light is reflected by the surface of the object, is then received by the imaging lens, and is finally imaged on the imaging lens; and the laser emitter and the imaging sensor are both electrically connected with the control and data processing apparatus.

2. The miniature solid-state laser radar according to claim 1, wherein the front end of the imaging sensor is provided with a narrow-band band-pass filtering lens; and a center wavelength of the narrow-band band-pass filtering lens is the same as a wavelength of the laser emitted by the laser emitter.

3. The miniature solid-state laser radar according to claim 1, wherein the laser emitter comprises a laser driving circuit, a laser diode and a laser projection lens.

4. The miniature solid-state laser radar according to claim 1, wherein the control and data processing apparatus is electrically connected with the laser emitter and the imaging sensor; the control and data processing apparatus is composed of a timing control interface, a data communication interface and a central processing unit; the timing control interface is electrically connected with the laser emitter and the imaging sensor; and the data communication interface is electrically connected with the imaging sensor.

5. The miniature solid-state laser radar according to claim 4, wherein the control and data processing apparatus is simultaneously connected with 4 laser emitters and 4 imaging sensors; the data communication interface and the imaging sensor are connected through an electronic switch; the imaging lens is arranged in front of the imaging sensors to focus the light on the imaging sensors; for the imaging lens, a level angle of the field of vision is greater than or equal to 90 degrees; a dispersion angle of the laser emitted by the laser emitter is greater than or equal to 90 degrees; and the field of vision of the imaging lens is superposed with a laser region emitted by the laser emitter.

6. A data processing method for a miniature solid-state laser radar, wherein the miniature solid-state laser radar comprises a laser emitter, an imaging lens, an imaging sensor and a control and data processing apparatus; the control and data processing apparatus is composed of a timing control interface, a data communication interface and a central processing unit; the method comprises the following steps:

at step I, the laser emitter is controlled by the timing control interface to selectively emit linear laser;

at step II, the imaging lens collects reflected laser light and images same on the imaging sensor;

at step III, the imaging sensor is controlled by the timing control interface to start exposure, receives light focused by the imaging lens, and sends imaging data to the central processing unit through the data communication interface; and at step IV, the central processing unit receives the imaging data, runs a structural light method to finally acquire point cloud data in a space environment, wherein the structural light method comprises laser light extraction and triangulation solving; the laser light extraction is configured to compare two adjacent frames of imaging data of the imaging sensor; when a difference between two frames of acquired pixel data is greater than a specified threshold, the pixel is determined to be located in a laser light candidate region; and the triangulation solving is configured to obtain three-dimensional coordinates of each sub-pixel point on the imaging sensor laser light candidate region through a triangulation measurement principle.

7. The data processing method for the miniature solid-state laser radar according to claim 6, wherein at step III, the central processing unit alternately controls, by the timing control interface, working of the laser emitter on the basis of periodically controlling the exposure of the imaging sensor; in a first time period, the central processing unit controls, by the timing control interface, the laser emitter to emit laser, and the imaging sensor synchronously starts exposure; after a time interval Ton, the laser emitter is shut off, and the imaging sensor stops exposure; in a second time period, the central processing unit controls, by the timing control interface, the laser emitter to not emit laser, and the imaging sensor starts exposure; after the time interval Ton, the imaging sensor stops exposure; and the first time period and the second time period are cyclically repeated.

8. The data processing method for the miniature solid-state laser radar according to claim 6, wherein the timing control interface controls the laser emitter and the imaging sensor to work at different moments, and splices a plurality of groups of final point cloud data results to obtain spliced large-range point cloud data.

* * * * *